US011936322B2

(12) United States Patent
Mollier

(10) Patent No.: US 11,936,322 B2
(45) Date of Patent: Mar. 19, 2024

(54) CONTROL INTERFACE FOR MEDIUM VOLTAGE CIRCUIT BREAKERS AND SWITCHES

(71) Applicant: Schneider Electric Industries SAS, Rueil Malmaison (FR)

(72) Inventor: Christophe Mollier, Coublevie (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 154 days.

(21) Appl. No.: 17/467,537

(22) Filed: Sep. 7, 2021

(65) Prior Publication Data

US 2022/0094283 A1 Mar. 24, 2022

(30) Foreign Application Priority Data

Sep. 8, 2020 (FR) .................................. FR2009083

(51) Int. Cl.
*H02P 5/00* (2016.01)
*H01H 3/26* (2006.01)
*H02B 1/24* (2006.01)

(52) U.S. Cl.
CPC ................. *H02P 5/00* (2013.01); *H01H 3/26* (2013.01); *H02B 1/24* (2013.01)

(58) Field of Classification Search
CPC .... H02P 5/00; H02P 1/02; H01H 3/26; H02B 1/24; H02M 1/08; H02M 1/32; H02M 3/158; H02M 1/00; H03K 17/16
(Continued)

(56) References Cited

U.S. PATENT DOCUMENTS

2014/0313621 A1* 10/2014 Innes ........................ H02P 3/22
361/24

FOREIGN PATENT DOCUMENTS

DE 3823574 * 11/1989 ............. H01H 51/00
DE 3823574 C1 11/1989
(Continued)

OTHER PUBLICATIONS

Search Report and Written Opinion dated May 5, 2021 for corresponding French Patent Application No. 2009083, 9 pages.

*Primary Examiner* — Edwin A. Leon
*Assistant Examiner* — Iman Malakooti
(74) *Attorney, Agent, or Firm* — Locke Lord LLP

(57) ABSTRACT

System for driving motors for operating switching units, in particular for an electrical supply substation, comprising control units for controlling the motors, wherein the control unit comprises, to have only one of the motors in operation at a time, a device for managing the priority of operation of the motors which is provided with a first line, referred to as the parallel line, carrying a binary datum comprising a first state representative of the stopping of all of the motors and a second state representative of the operation of any one of the motors, to which the units are connected in parallel, the parallel line being connected to a device for preventing/allowing the starting of the motor of each of the units and a second line, referred to as the series line, to which the units are connected in series in an upstream/downstream chain, the series line constituting a means for preventing the operation of the motors downstream of the any one of the motors on detection of a signal for starting the any one of said motors, to which the units are connected in series, the series line being connected to a device for preventing the operation of the motor of each of the units.

17 Claims, 10 Drawing Sheets

(58) Field of Classification Search
USPC .......................................................... 200/5 R
See application file for complete search history.

(56) References Cited

FOREIGN PATENT DOCUMENTS

| | | |
|---|---|---|
| EP | 2797219 A2 | 10/2014 |
| WO | 2011147928 A1 | 12/2011 |
| WO | 2020109285 A1 | 6/2020 |

* cited by examiner

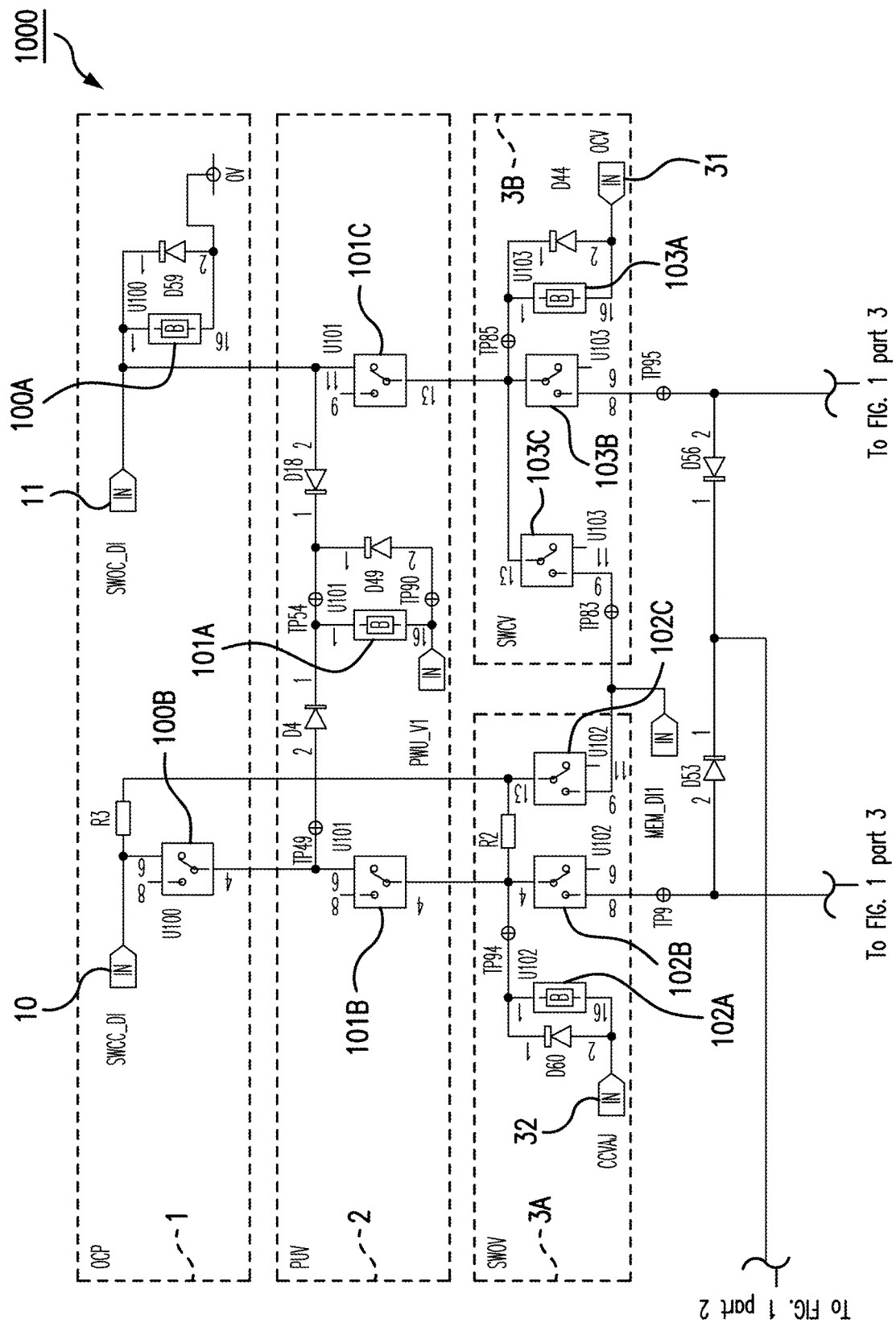
FIG. 1 part 1

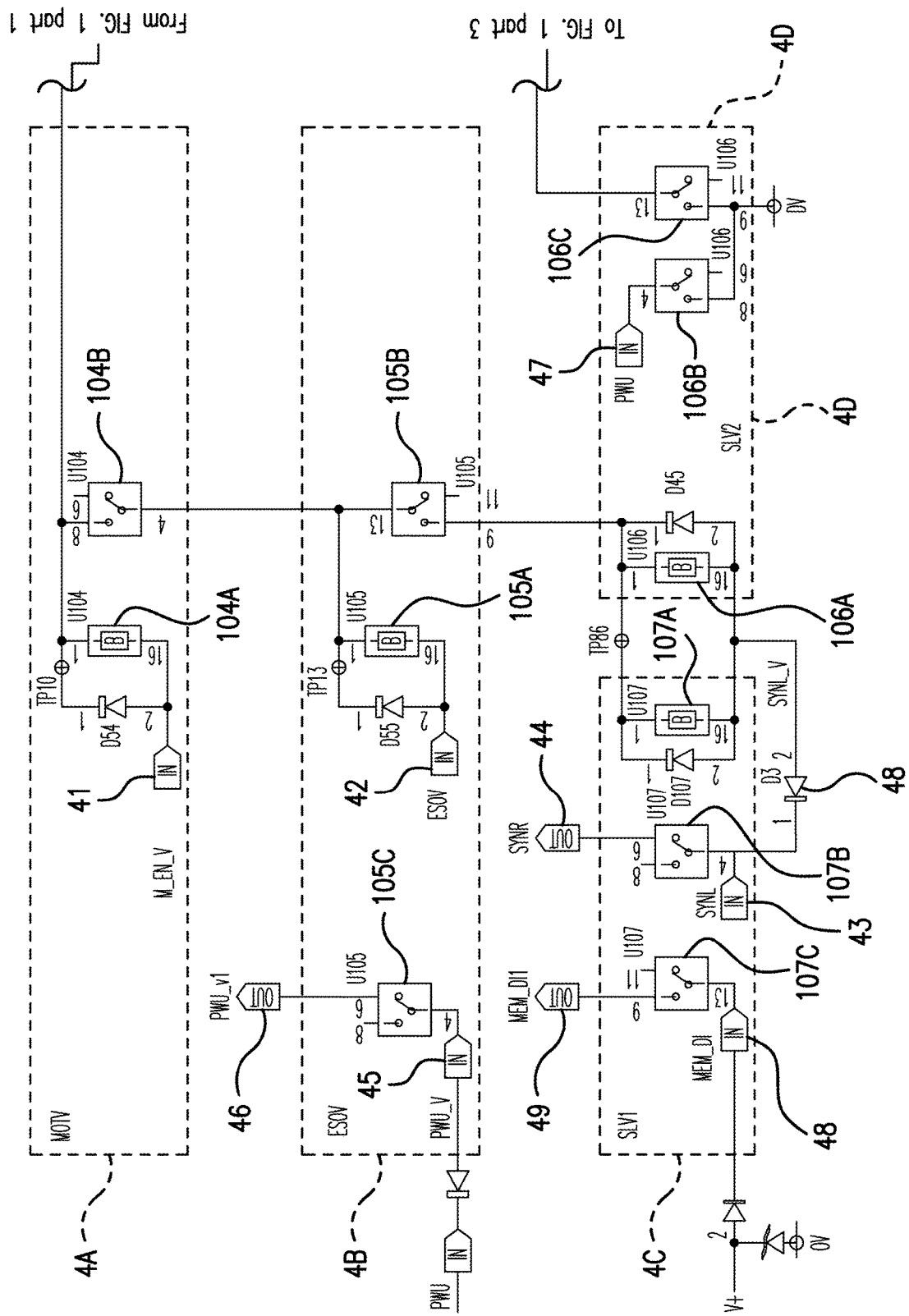
FIG. 1 part 2

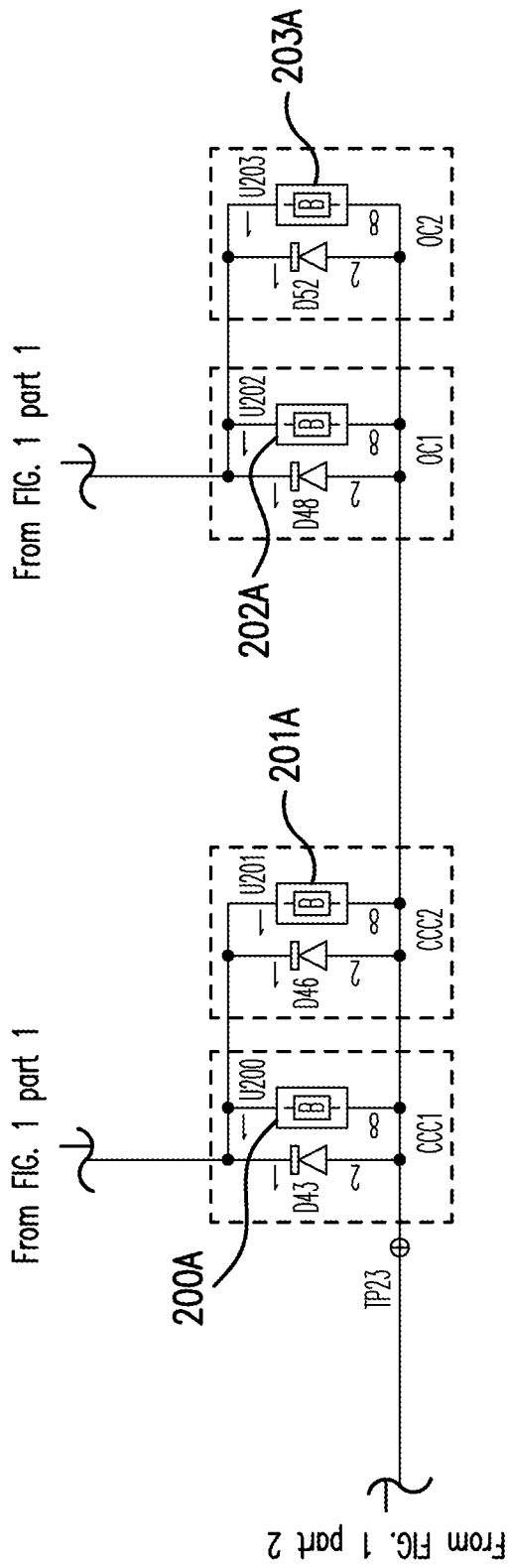
FIG. 1 part 3

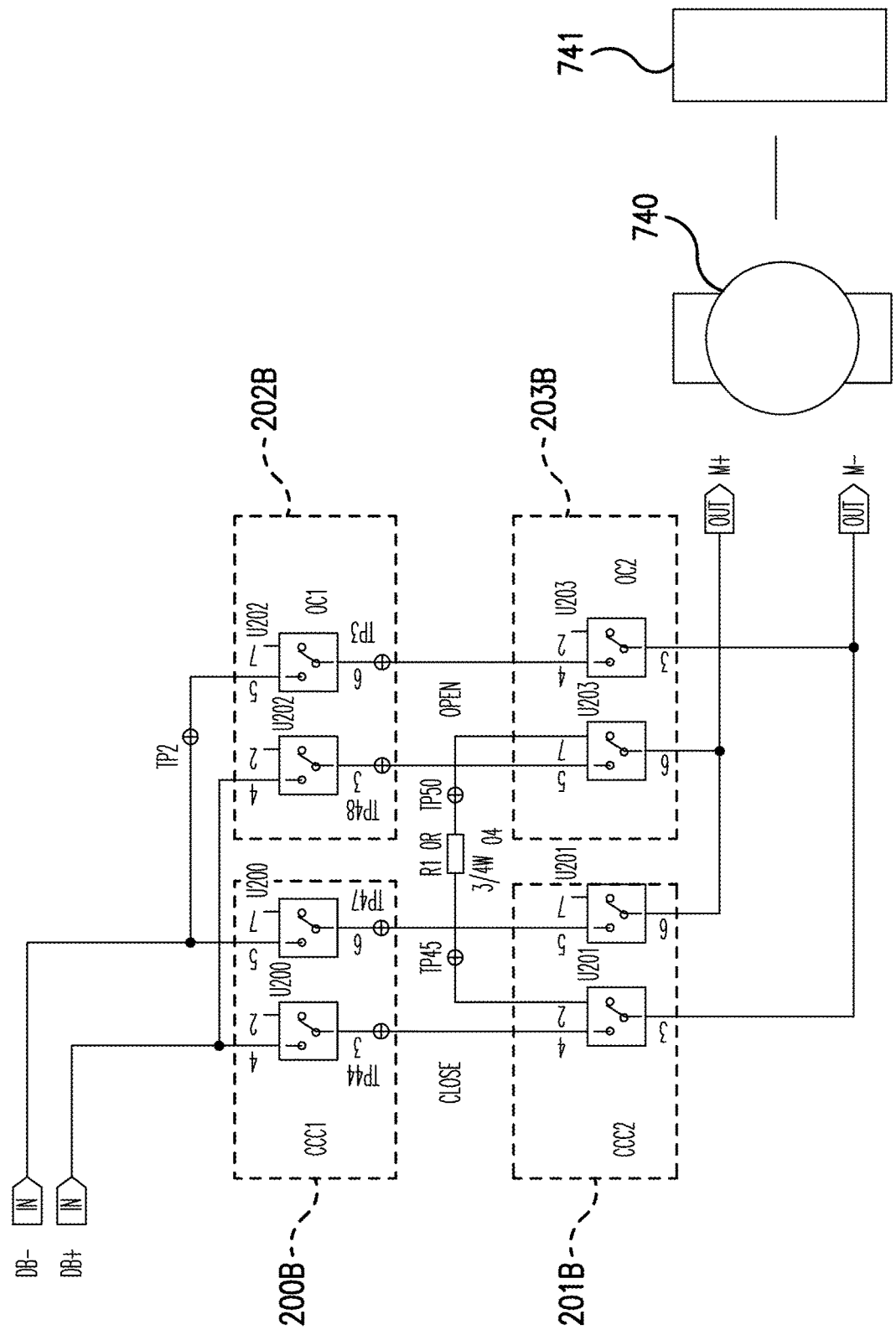
FIG. 1 part 4

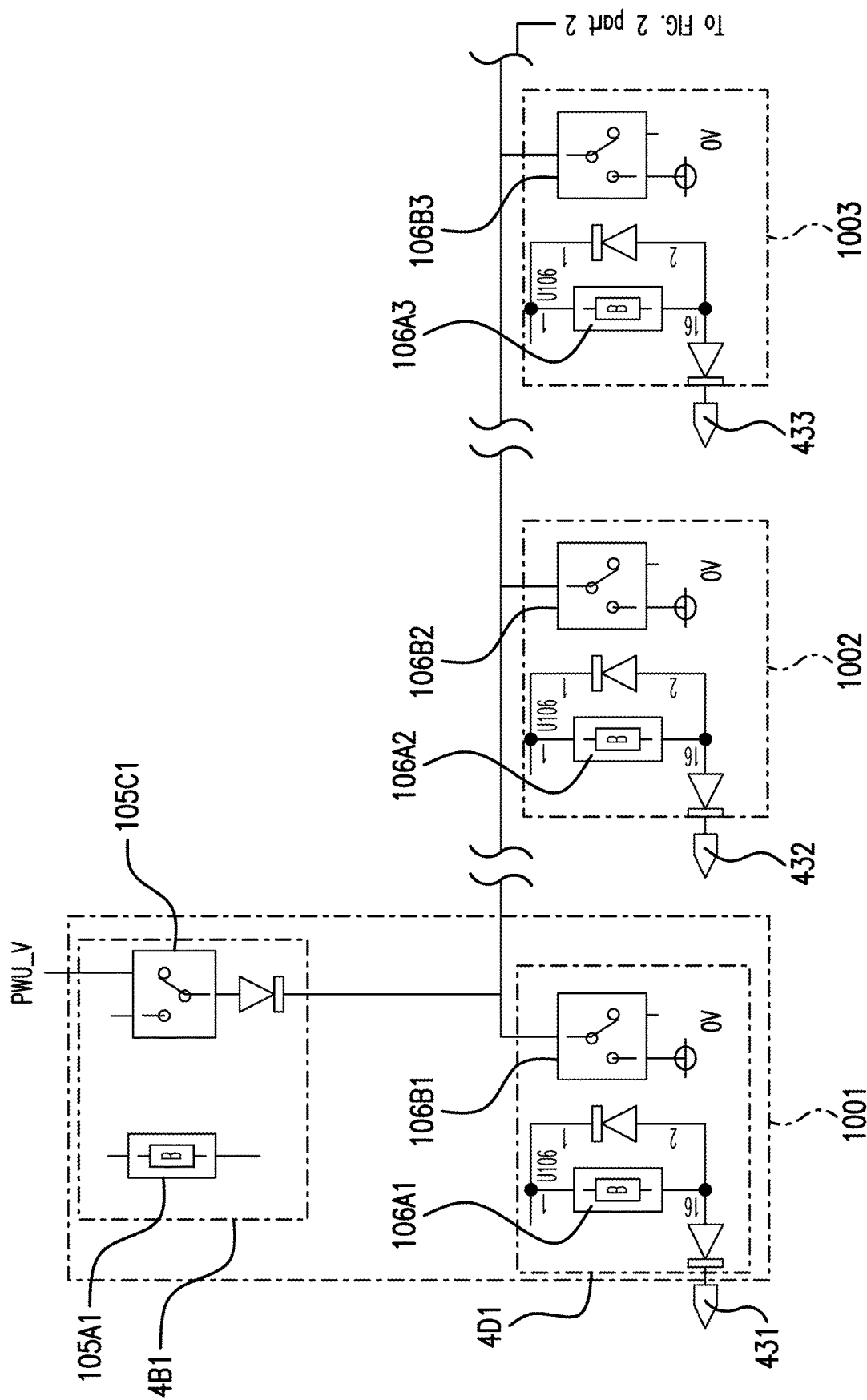
FIG. 2 part 1

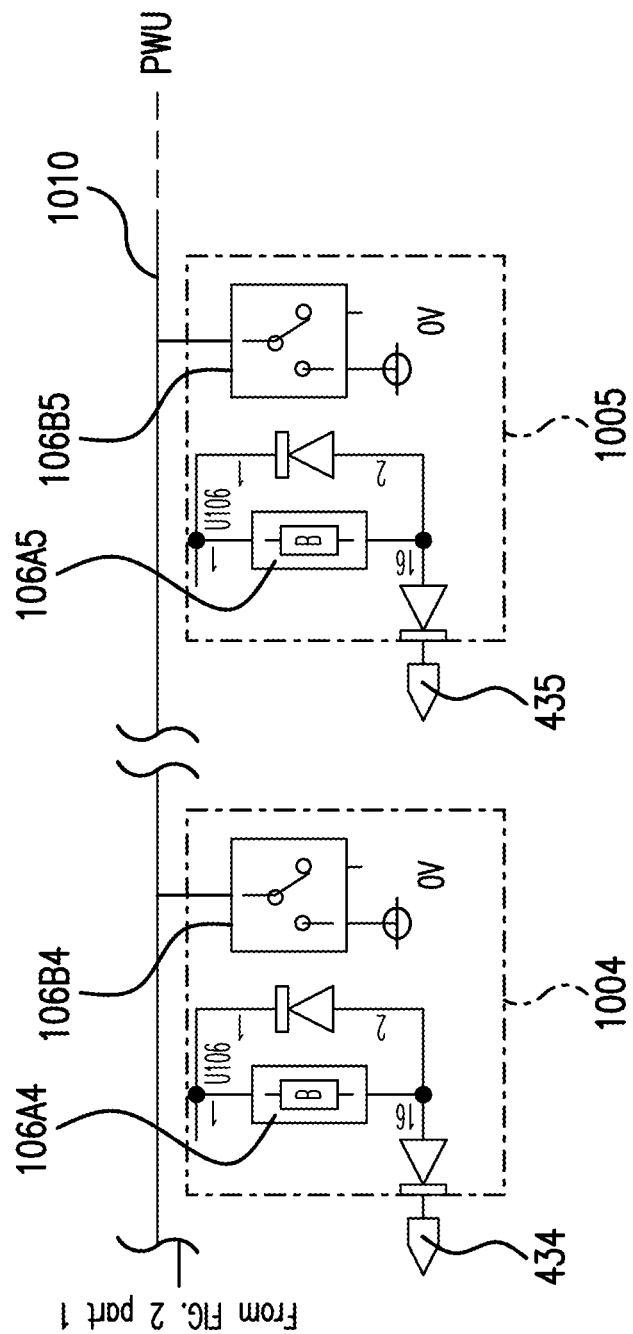
FIG. 2 part 2

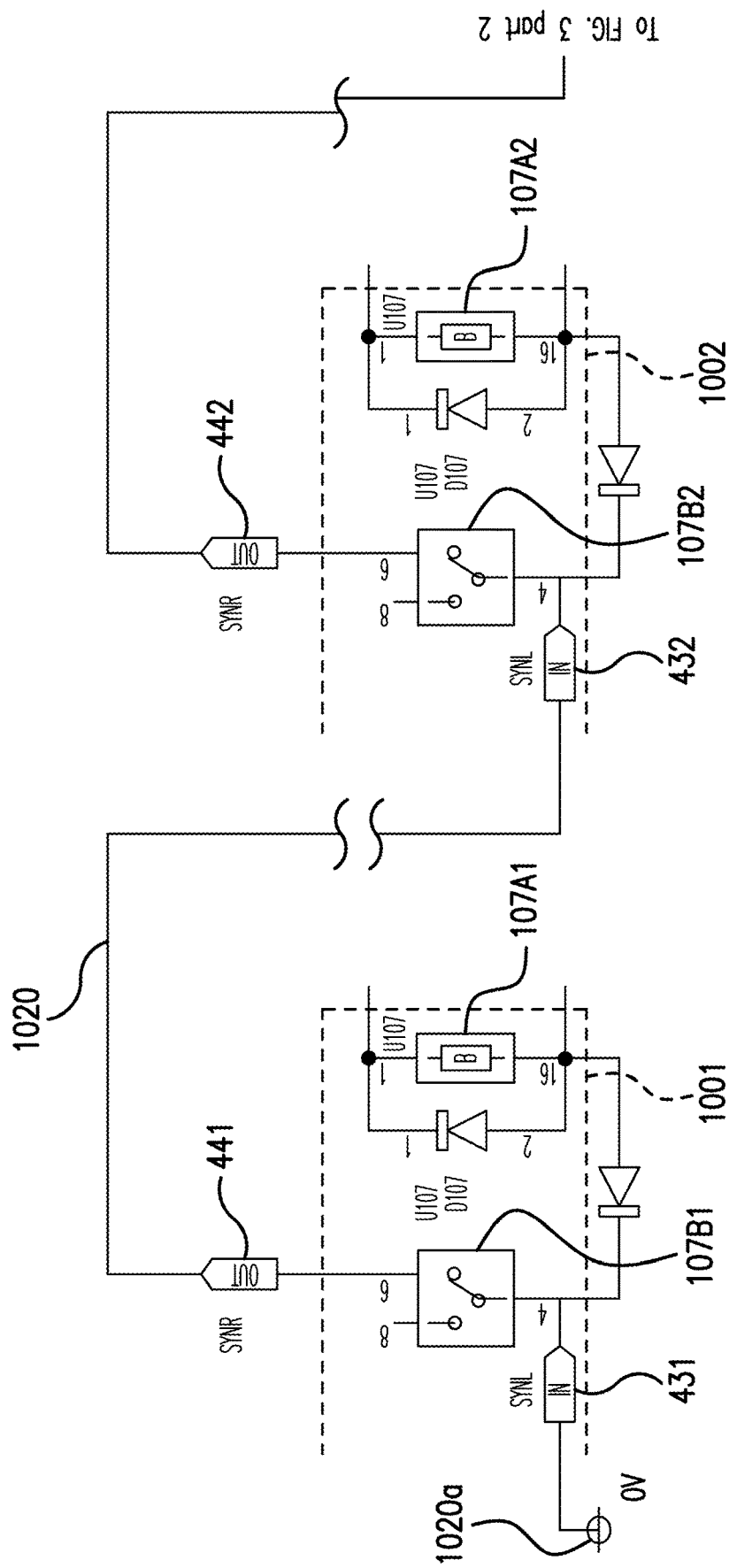
FIG. 3 part 1

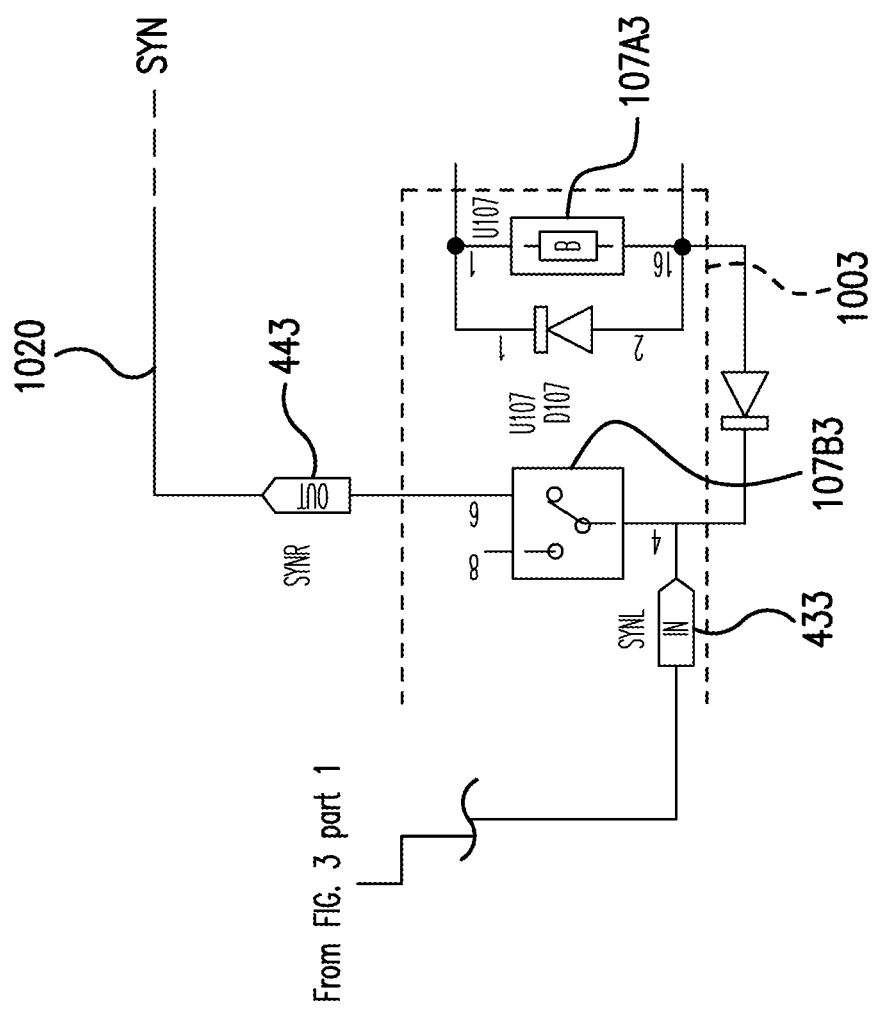
FIG. 3 part 2

CONTROL INTERFACE FOR MEDIUM VOLTAGE CIRCUIT BREAKERS AND SWITCHES

TECHNICAL FIELD

The invention relates more particularly to the field of medium-voltage current distribution substations and the driving thereof. Medium-voltage substations generally manage the distribution of current in a range generally between 1000 V and 50 000 V. For such voltages, switching units such as switches and circuit breakers must be driven by reliable and fast control devices and, in general, these switching units comprise an operating device which is armed such that a compressed spring relaxes to actuate the circuit breakers or switches or open the cutters of the switches or circuit breakers very rapidly. To remotely operate their operating devices, modern switching units employ electric motors. These motors, which allow the operating device to be armed, are supplied with a voltage that is generally between 24 V and 48 V and consume a significant current during their operation.

In substations, it is common for these motors to be supplied with power by means of a UPS (uninterruptible power supply) inverter to ensure that operation continues to be managed even if the power supply network is interrupted. Motor start-up features a current peak, and if multiple motors are to be started up at the same time, then a powerful, bulky and expensive inverter is required. To decrease bulk and cost, the inverter is sized so as to control only one motor at a time, and a system is provided to ensure that the various motors are always controlled in sequence.

PRIOR ART

One known solution to ensure this systematic sequencing of motor start-up is to have a control circuit board with a microcontroller per functional unit and a communication network between the motor control functional units and the control circuit board (for example a network with a protocol known under the name "MODBUS" for which the motors and the control units thereof each have a unique address), the microcontroller managing timings between the motor start-up commands. Such a device is expensive because it requires master-slave electronic management which requires a computerized circuit board per functional unit and a bulkier housing. In addition, potential causes for faults are increased.

Technical Problem

It is desirable to implement a less expensive and decentralized solution for the sequenced activation of the motors.

SUMMARY OF THE INVENTION

To achieve this, the present invention relates to a system for driving motors for operating switching units, in particular for an electrical supply substation, comprising control units for controlling said motors, which comprises, to have only one of said motors in operation at a time, a device for managing the priority of operation of the motors which is provided with a first line, referred to as the parallel line, carrying a binary datum comprising a first state representative of the stopping of all of the motors and a second state representative of the operation of any one of the motors, to which the units are connected in parallel, said parallel line being connected to a device for preventing the starting of the motor of each of the units and a second line, referred to as the series line, to which the units are connected in series in an upstream/downstream chain, said series line constituting a means for inhibiting the operation of the motors downstream of said any one of said motors on detection of a signal for starting said any one of said motors, said series line being connected to a device for preventing the operation of the motor of each of the units.

In other words, the present invention relates to a system for driving motors for operating switching units comprising control units for said motors. To have just one of said motors operating at a time, a device for managing the priority of operation of the motors is provided:

with a first line, referred to as the parallel line, configured to transmit a binary datum corresponding to:
  a first state if all of the motors are at standstill, or
  a second state if any one of the motors is in operation, and
with a second line, referred to as the series line, configured to transmit a datum, in particular a binary datum, associated with each control unit corresponding to:
  a first state if none of the motors upstream of the motor of said control unit has received a command to start and/or is in operation, or
  a second state if a motor upstream of the motor of said control unit has received a command to start and/or is in operation.

The starting of a particular motor is possible only when the binary data on the parallel line and on the series line that are associated with the control unit of this motor are respectively in the first state.

More particularly, devices for preventing the starting of the motor of each of the units are connected in parallel to the parallel line. Devices for inhibiting the operation of the motor of each of the units are connected in series in an upstream/downstream chain to the series line.

To control and manage the priority of the motor control units, this system uses two simple lines which do not require any computer protocol or series or parallel network management components at the level of the control units, which simplifies the operation of the units and of the associated control device and avoids operations of reprogramming the units when units are potentially added or removed.

Said devices for preventing the starting of the motor and inhibiting the operation of the motor may be produced using wired logic or be embodied by a system with a programmed microcontroller or microprocessor system provided with inputs for detecting the state of the lines and with outputs for driving the power relays for controlling the motors.

The features disclosed in the following paragraphs may, optionally, be implemented. They may be implemented independently of one another or in combination with one another:

Each unit may comprise a logic device for placing the first, parallel line in the second state representative of the operation of its motor preceding the bringing into operation of the motor of this unit, said second state activating the device for preventing the starting of the motors of the other units, said logic device further comprising means for placing the parallel line back in the first state at the level of the unit on said motor stopping.

This makes it possible to chain the units together in a straightforward manner without concern as to the number of units present in the substation.

Each of the units may comprise a switching device for switching the series line, wired to switch the series line on receiving a command to start the motor of said unit, the switching of the series line by an upstream unit constituting said signal for starting the motor of the upstream unit activating said devices for inhibiting the operation of the motor of the downstream units with respect to said upstream unit, said switching device being further configured to place the series line back in the initial state at the level of said upstream unit on said motor stopping.

Each unit may comprise a wired or programmed sequential logic for activating and deactivating the starting up of its motor and for managing said series and parallel lines.

Each unit may comprise a circuit or a sequence for deactivating its device for preventing the starting of the motor on detecting the starting up of its own motor.

The priority between the units is established by the position of the units, from upstream to downstream, for example from left to right in an enclosure.

The units may comprise a sequential logic for controlling the operation of their motor, said sequential logic comprising or driving one or more devices for controlling power relays for supplying said motor with current in a direction of opening and in a direction of closing of said switching unit, at least one device for preventing the starting of the motor and at least one device for inhibiting the operation of the motor of said priority management device.

This makes it possible to produce simple units without digital components which are easy to implement and maintain.

The sequential logic may be provided with a first stage comprising a first circuit for preventing/allowing the operation of the motor in a direction of closing of said switching unit provided with a first control device preventing operation of the motor in the direction of closing of the switching unit on detection of a command to operate the motor of said switching unit in a direction of opening of the switching unit.

This constitutes a safety feature that prioritizes switching of the controlled circuit over its operation.

The sequential logic may be provided with a second stage comprising at least one said device for preventing the starting of the motor provided with a second control device driven by an input for receiving said binary datum validated by a preventing/allowing circuit configured to block the passage of the binary datum when the motor to be started or in operation is the motor belonging to the unit and to allow the passage of the binary datum when the motor to be started or in operation is a motor external to the unit.

This allows the motor of the unit to operate when the command to start up comes from its unit.

The sequential logic may be provided with a third stage for managing the parallel line and the series line.

This stage will switch the series line to downstream when the unit starts its motor.

The sequential logic may be provided with at least one power control stage provided with at least one pair of power switches for supplying current for operating the motor in the direction of opening of the switching unit and for supplying current for operating the motor in the direction of closing of the switching unit.

According to the example, the power switches are schematically shown as electromechanical relays but relays in the form of IGBT semiconductor, contactor, or other components may be used.

The sequential logic may be provided with at least a fourth stage provided with one or more third circuits for preventing/allowing the operation of the motor on detection of parameters of the motor.

This makes it possible to take account of faults such as ground faults, cover opening or other faults to prevent motor operation.

The control unit may be configured such that, on receiving a level representative of the operation of a motor external to the unit on the parallel line, said second control device switches signals for controlling the operation of the motor at the level of said device for preventing the starting of the motor in a direction of opening of the switching unit and in a direction of closing of the switching unit.

At least some of said control devices, circuits for preventing/allowing the operation of the motor, device for preventing the starting of the motor and device for inhibiting the operation of the motor may be formed by signal-switching relays. These relays may be electromechanical or static semiconductor relays such as, for example, analogue switches.

In the case of electromechanical relays, one of the control devices of the fourth stage may comprise an input for an end-of-travel sensor for the opening of the switching unit connected to a coil for controlling the opening of a first relay for preventing/allowing the operation of the motor in the direction of opening of the switching unit so as to stop the motor at the end of opening of said switching unit and an input for an end-of-travel sensor for the closing of the switching unit connected to a coil of a second relay for preventing/allowing the operation of the motor in the direction of closing of the switching unit so as to stop the motor at the end of closing of said switching unit.

The unit may comprise a circuit for bypassing the device for preventing the starting of the motor activated by a circuit (4C) for detecting the operation of the motor of said control unit.

This avoids switching the motor of the unit whose command is valid.

The unit may comprise a relay for allowing the operation of the motor, the coil of which relay is connected to an input for receiving a signal for detection of authorization of the operation of the motor.

The unit may comprise a relay for allowing/preventing operation, the coil of which is connected to an input for receiving a signal for detection of the grounding of the medium-voltage switch.

The third stage of the unit may comprise a stage for controlling authorization of the operation of the motor in the presence of an upstream connection to the series line.

The control for authorizing operation in the presence of an upstream connection controls a relay, which closes the power supply of the cold spot of the coils of the power relays for controlling the motor, and closes a relay for zero-setting the parallel line during the operation of the motor of said unit to be transmitted to other units.

In the case in which the upstream line is open, the control for authorizing operation opens the power supply of the cold spot of the coils of the power relays for controlling the motor, and opens the relay for zero-setting the parallel line, thereby preventing the operation of the motor and zero-setting the parallel line.

The sequential logic may advantageously be timed by the switching times of the signal-switching relays.

BRIEF DESCRIPTION OF THE DRAWINGS

Other features, details and advantages of the invention will become apparent upon reading the description provided below and upon examining the appended drawings, in which:

FIG. 1 shows a simplified exemplary diagram of a motor control unit according to the present description;

FIG. 2 shows a simplified diagram of an example of the chaining of multiple control units in parallel according to the present description;

FIG. 3 shows a simplified diagram of an example of the chaining of multiple control units in series according to the present description;

DESCRIPTION OF THE EMBODIMENTS

Figure 4:
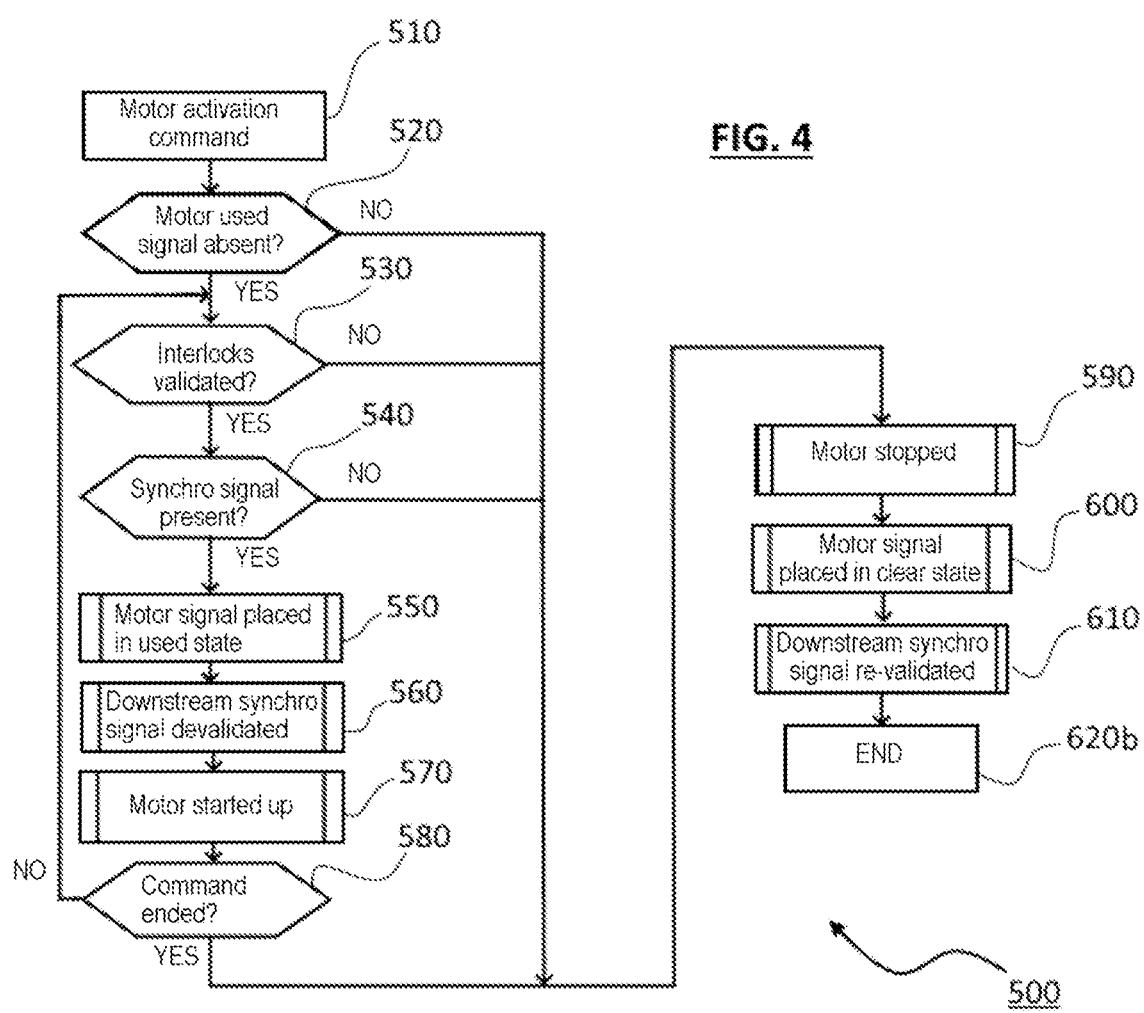
FIG. 4 shows a flowchart of a wired or programmed sequential logic applicable to the invention.

The drawings and description below contain, for the most part, elements which not only serve to better elucidate the present invention, but also contribute to the definition thereof, where appropriate.

The invention is aimed at "smart" medium-voltage substations that comprise a plurality of switching units such as circuit breakers or medium-voltage switches driven by an external interface.

Medium voltage is commonly a voltage from 1000 V to 50 000 V. The switching units are generally circuit breakers or switches from 600 A to 1250 A for secondary distribution.

The switching units comprise motors that switch the contacts of switching units and allow the cutters to be opened very rapidly in order to reduce or eliminate electric arcing.

Operation may be based on the compression of a spring which, when it is released, allows sudden switching of the cutter after passing an equilibrium point for switching units, for example known as CDT for the applicant, or a device that stores energy on closing a switch to arm a reopening spring for switching units known as CD1 or CD2 for the applicant.

This type of substation driven by around-the-clock remote control generally comprises a small inverter capable of supplying power to just one switching unit motor at a time.

Some switching units which store energy for their switching require automatic start-up of their motor if they need to reload it. During the installation of the substation in particular and in certain fault cases, there may be simultaneous requests for reloading the switching units while the inverters cannot deliver peak current to a plurality of motors.

Each switch has its motor and its control unit in the form of an electronic or electrical circuit board which comprises inputs for sensors or microswitches to allow or prevent the operation of power relays for controlling the motor according to the presence or otherwise of a motor operation command and the presence or absence of faults in the switching units.

A substation generally comprises from three to several tens of units.

In the context of the present invention applied to a relay system, account is taken of the fact that the motor control power relays have a reaction time of the order of 5 to 20 ms which is longer than the reaction time of a control logic, such as a relay control logic, the reaction time of which is instead of the order of 3 ms.

This allows a unit receiving a command to start up its motor to transmit a "synchronization" signal to the other units before actually starting up its motor following the switching of its power relay as well as to stop the sequence of starting up its motor on receiving a synchronization signal from a third party unit well before actually starting up its motor.

As will be seen hereinbelow, one principle of the present description is to use a parallel wired line connected to a device for preventing the start-up of the motor of each of the units and a second, series wired line connected to a device for inhibiting the operation of the motor of each of the units.

FIG. 1 shows an exemplary control unit 1000 for at least one motor for operating a switching unit which comprises a sequential logic with a relay for controlling the operation of said motor. The principal employed applies in a similar manner to motors for controlling circuit breakers or switches.

The principle of sequential logic as described for a switch comprises a cascade of signal switching relays provided with a first stage 1 comprising a first relay for preventing the operation of closing said switching unit when a priority opening command is sent.

This first stage comprises a first 100 A coil, the supplying of power to which switches the circuit 100B of said first relay on detecting a command to operate the opening of said switching unit.

A second stage 2 will prevent the operation of the motor if the unit receives a signal for power use by another unit.

This second stage is provided with at least a second relay 101B, 101C for inhibiting the motor provided with a second coil 101A supplied with power via an input 21 which receives the signal for the operation of a motor external to the unit.

The unit further comprises a third stage 3A, 3B for validating the operation of the motor provided with relays 102B, 102C, 103B, 103C and with inputs for opening end-of-travel 31 and closing end-of-travel 32 signals for stopping the motor when it reaches end of travel.

According to the example, the unit further comprises at least a fourth stage 4A, 4B provided with one or more fourth relays for preventing operation on detecting conditions for preventing the operation of the motor such as a grounded medium-voltage switch, inter alia.

The control unit comprises at least one power relay for supplying current to the motor in the direction of closing of the switch, embodied here by the dual relay 200B, and at least one power relay for supplying current to the motor in the direction of opening of the switch, embodied here by the dual relay 202B. According to the example, the unit comprises relays 200B, 201B in series for opening and relays 202B, 203B in series for closing the switch to reduce arcing on starting and stopping the motors.

These relays receive power supplies DB+ and DB− and control the motor supply voltages M+, M− for supplying the motor 740 for controlling the switching unit 741.

Lastly, the unit comprises a motor priority management stage 4C, 4D seen hereinafter.

To manage the operation of just one motor at a time in a substation comprising a plurality of switching units, the present description proposes a device for managing the priority of operation of the motors which is provided with a first line 1010 and with a second line 1020.

The first line 1010, referred to as the parallel line or PWU, is shown in FIG. 2. This line carries a binary datum comprising a first state representative of the stopping of all of the motors and a second state representative of the operation of any one of the motors. In the present description, the first state is a "non-connected" state and the second state is the zero-setting of the line, although the opposite logic is of course possible. What is meant by "carrying a binary datum" is that the line is configured to transmit this binary datum. What is meant by "second state representative of the operation of any one of the motors" is that any one of the motors is in operation, in particular following reception of a start-up command.

Thus, the first line is configured to transmit one and the same binary datum to all of the motor control units corresponding either:
to the first state if all of the motors are at standstill, or
to the second state if any one of the motors is in operation.

Still according to FIG. 2, the units of the substation 1001, 1002, 1003, 1004, 1005, . . . are connected in parallel on the line 1010, said parallel line being connected to a device for preventing the starting of the motor of each unit comprising the relays 106B of the priority management stage 4D of each of the units, in this example the relays 106B1 to 106B5. These relays allow the line to be set to zero during a command to start the motor of a unit. This circuit is seen in FIG. 1 under the reference 106B and the control coil 106A for the relay 106B will be active during the command to start the motor of the unit when the control signal is validated at the level of the relay 105A.

This line is further connected to a circuit for allowing/preventing the operation of the motor for the units through a relay 105C1 shown only for the unit 1001 to avoid overloading the diagram. This relay can be seen in FIG. 1 under the reference 105C and is controlled by a coil 105A which will allow the signal PWU 45 to go to PWU_V1 46 to prevent the sequence of starting up the motor of the unit when the motor of another unit is running while the coil 105A will switch the connection between the signal PWU and the signal PWU_V1 when it is the motor of the unit which is starting up.

When the motor of a unit starts up, the line PWU 1010 is therefore set to zero and the corresponding input 21 of the device for preventing start-up of this unit is deactivated.

The second line 1020, referred to as the series line and shown in FIG. 3, is a line for inhibiting the operation of the motors downstream of said any one of said motors on detecting a start-up signal from said any one of said motors.

Thus, the second line is configured to transmit a datum, in particular a binary datum, associated with each motor control unit, corresponding either to:
a first state if none of the motors upstream of the motor of said control unit has received a command to start and/or is in operation, or to
a second state if a motor upstream of the motor of said control unit has received a command to start and/or is in operation.

This makes it possible to give priority to start-up of the motors from upstream to downstream, i.e. the sequence always starts with the motor furthermost upstream and follows a sequence that cascades downstream.

As shown in FIG. 3, the series line comprises an upstream end 1020a set to zero and passes through a switching relay 107B of each unit from the upstream unit 1001 to the downstream units 1002, 1003, . . . . Returning to FIG. 1, the control coil 107A for the switching relay 107B has its hot spot connected to the motor control of the corresponding unit and its cold spot connected to the series line through a non-return diode D3.

Thus, and according to FIGS. 1 and 3:
a. either the upstream series line SYNL 43 is switched by an upstream unit and the cold spot of the coils 107A and 106A is not supplied with power which prevents:
i. the switching of the downstream series line SYNR 44 at the level of the relay 107B;
ii. the starting of the motor at the level of the relays 106B, 106C controlled by the coil 106A;
iii. the bypassing of the prevention to operate PWU_V 21 by means of the signal MEM_DI1 48 at the level of the relay 107C
b. or the upstream series line SYNL 43 is active and:
i. the relay 107B allows the switching of the downstream series line SYNR 44 when the corresponding command for the motor of the unit arrives at the hot spot of the coil 107A;
ii. the relay 106B may set the parallel line PWU to zero;
iii. the relay 106C may control the starting of the motor.

Thus, each unit comprises a logic device or control stage 106A, 106B for placing the first, parallel line in the second state representative of the operation of its motor in response to the operation of the motor of this unit, said second state activating the devices for preventing the starting of the motors of the other units.

Returning to FIG. 1, the control stage 106A constitutes a stage for allowing the operation of the motor in the presence of an upstream connection 43 to the series line. In the presence of an upstream connection, the command to operate the motor closes a relay 106C which validates the supply of power to the cold spot of the coils 200A, 201A, 202A, 203A of the motor control power relays and closes a relay 106B for zero-setting the parallel line PWU 1010 to the terminal 47 during the operation of the motor of said unit to transmit this information to the other units.

If the upstream connection is open, the relay 106A cannot be supplied with power which leaves the relay 106B open and prevents the supply of power to the relay 106C, thus preventing the starting of the motor.

The command 107A in turn opens the series connection to downstream SYNR 44 at the level of the relay 107B during the operation of the motor of the unit.

In addition, the units further comprise means for clearing the parallel line on stopping of said motor through the relay 105B which, with the switching of the input of the hot spot of the coil 106A when the motor stops (for example in the case of activation of an end-of-travel contact 31 or 32), opens the relay 106B.

A sequence for starting up the motor may comprise the following validation steps:
verifying that the PWU is high impedance at the level of the input 21 PWU_V1,
verifying the motor operating conditions at the level of the end-of-travel contact CCVAJ, OCV inputs 31, 32 and at the level of the input 42 grouping together the microswitches such as grounding the medium-voltage switch ESOV,
stopping the PWU high impedance verification with the opening of the contact between PWUV and PWUV1 at the level of the relay 105C,
if SYNL of the unit is at 0 V, i.e. when no upstream unit is in operation:
a. allowing the driving of the power relays at the level of the relay 106C which are controlled by the coil 106A;
b. setting the parallel line PWU to 0 V at the level of the relay 106B,
c. placing the downstream series line SYNR at high impedance with the relay 107B to switch the power for the downstream interfaces,
d. for as long as the motor is supplied with power, maintaining the bypassing of the test of the connection PWU_V with the contact 105C.

Once the command has ended, the parallel line PWU returns to high impedance at the level of the relay 106B and the downstream line SYNR is reconnected to the upstream line SYNL at the level of the relay 107B while the signal MEM_DI is deactivated and the control for the power relays is reopened at the level of the relay 106C.

The upstream series line SYNL incoming into the unit at the level of the upstream connection 43 and the downstream series line SYNR exiting from the unit at the level of the connection 44 therefore allows prioritization of motor operation from upstream to downstream.

In the event that two units receive an order simultaneously, it is the upstream unit which obtains power and power to the downstream unit will be disconnected.

PWU makes it possible to inform the units that power to the motor of a unit is in use which makes it possible to ignore the start-up commands of the other units.

In this example, the series connection is connected to 0 V when motor operation is allowed and to high impedance in the opposite case. However, it is conceivable to produce a circuit in which the operating signal for an upstream unit will be at a voltage other than zero.

In this example, the parallel line PWU is connected to 0 V if one of the motors is in use and is at high impedance if no motor is in use. Other configurations are possible within the scope of the invention.

FIG. 4 shows a representation in the form of a flowchart of an operating sequence of a wired or programmed logic applicable to the invention.

Specifically, according to the invention, the wired logic of the example of FIG. 1 may be replaced with a circuit board such as a circuit board with a microprocessor or microcontroller provided with inputs for sensors such as special switches such as interlock switches which inhibit motor start-up in the case of abnormal conditions such as opening of the housing, grounding of the medium-voltage switch, with inputs for motor end-of-travel sensors, inputs/outputs for managing the parallel 1010 and series 1020 lines and outputs for controlling the power relays 200, 201, 202, 203 for the motors.

In such a case, the microprocessor or microcontroller comprises motor control software which will perform the sequences required to operate the motors and position the series and parallel lines in the desired states according to the simplified exemplary sequential logic 500 of FIG. 4 which is also applicable to the wired system of FIGS. 1 to 3.

In this context, FIG. 4 shows an operating sequence initiated by a motor activation command 510. Once the command has been received, a sequence of tests is initiated.

This sequence comprises:
  a first step 520 in which the positioning of the parallel line is tested to verify whether a PWM motor used signal of the parallel line 1010 is not already present,
  a second step 530 in which the positioning of the interlock switches is tested to guarantee the correct operation of the motor associated with the board;
  a third step 540 in which it is verified that the synchronization signal 1020 from the upstream modules is indeed present.

If the result of all of these steps is positive, the unit in question places the motor signal of the parallel line 1010 in the used state in step 550, devalidates the synchronization signal of the series connection 1020 for the downstream units in step 560, starts up the motor in step 570 and then tests whether the command has ended in step 580.

When the end of the command has been validated, the software triggers the stopping of the motor in step 590, places the PWM signal of the parallel line 0 back in the clear state in step 600, re-validates the synchronization signal for the downstream units in step 610 and then the sequence ends in end step 620b to return to waiting for an activation command.

Conversely, when the command has not ended, a portion of the loop is executed again to test whether a defect is present in particular so that the process may be interrupted by stopping the motor.

Figure 5:
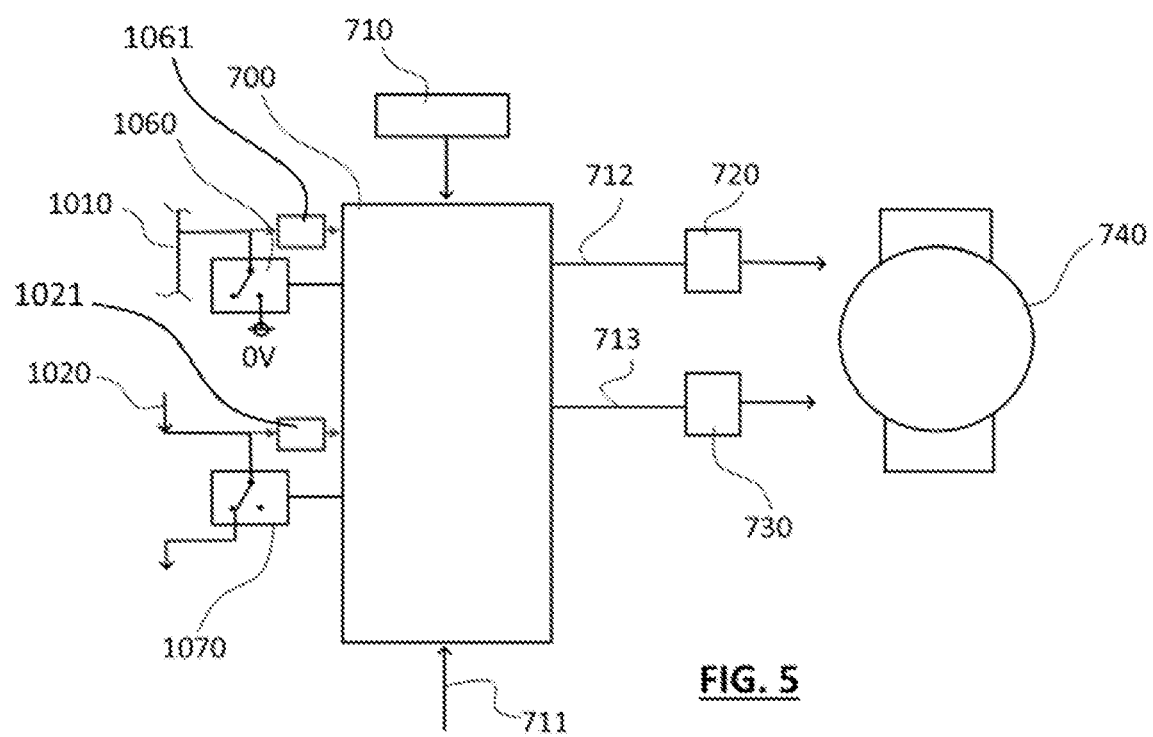
FIG. 5 shows an exemplary diagram of a device with a microprocessor.

A controller device 700 with a microprocessor or microcontroller is schematically shown in FIG. 5 with, at 710, the interlock switches connected to inputs of the controller, the parallel connection and the series connection connected to inputs of the controller through isolation components 1021, 1061, the parallel connection connected to an output of the controller through a first relay or analogue switch 1060, the series connection 1020 connected to an output of the controller through a second relay or transistor, the signal for controlling motor start-up at the input 711 of the controller and the outputs 712, 713 driving relays 720, 730 which are similar to the relays 200, . . . , 203 of FIG. 1 for driving the motor 740.

The invention is not limited to the examples described hereinabove. In particular, as seen above, the principle of the invention for which two wired lines connect motor control units with sequential logic may be applied to systems for which the sequential logic is produced using a digital circuit board with a microprocessor, microcontroller or programmable logic instead of relays.

The invention claimed is:

1. A system for driving motors for operating switching units, in particular for an electrical supply substation, comprising control units for controlling said motors, wherein the system comprises, to have only one of said motors in operation at a time, a device for managing the priority of operation of the motors which is provided with a first line, referred to as the parallel line, carrying a binary datum comprising a first state representative of the stopping of all of the motors and a second state representative of the operation of any one of the motors, to which the control units are connected in parallel, said parallel line being connected to a device for preventing the starting of the motor of each of the control units and a second line, referred to as the series line, to which the control units are connected in series in an upstream/downstream chain, said series line constituting a means for inhibiting the operation of the motors downstream of said any one of said motors on detection of a signal for starting said any one of said motors, to which the control units are connected in series, said series line being connected to a device for inhibiting the operation of the motor of each of the control units.

2. The system for driving a plurality of motors for operating switching units according to claim 1, wherein each unit comprises a logic device for placing the first, parallel line in the second state representative of the operation of its motor preceding the bringing into operation of the motor of this unit, said second state activating the devices for preventing the starting of the motors of the other units, said logic device further comprising means for placing the parallel line back in the first state at the level of the unit on said motor stopping.

3. The system for driving a plurality of motors for operating switching units according to claim 1, wherein each of the units comprises a switching device for switching the series line, wired to switch the series line on receiving a command to start the motor of said unit, the switching of the series line by an upstream unit constituting said signal for starting the motor of the upstream unit activating said devices for inhibiting the operation of the motor of the downstream units with respect to said upstream unit, said switching device being further configured to place the series line back in the initial state at the level of said upstream unit on said motor stopping.

4. The system for driving a plurality of motors for operating switching units according to claim 1, wherein each unit comprises a wired or programmed sequential logic for activating and deactivating the starting up of its motor and for managing said series and parallel lines.

5. He system for driving a plurality of motors for operating switching units according to claim 1, wherein each unit comprises a circuit for deactivating its device for preventing starting on detecting the starting up of its own motor.

6. A control unit for controlling at least one motor for operating a switching unit, wherein the control unit is configured to be connected to a driving system according to claim 1, wherein the control unit comprises a sequential logic for controlling the operation of said motor, said sequential logic comprising or driving one or more devices for controlling power relays for supplying said motor with current in a direction of opening and in a direction of closing of said switching unit, at least one device for preventing the starting of the motor and at least one device for inhibiting the operation of the motor of said priority management device.

7. The control unit according to claim 6, wherein the sequential logic is provided:
  with a first stage comprising a first circuit for preventing/allowing the operation of the motor in a direction of closing of said switching unit provided with a first control device preventing operation of the motor in the direction of closing of the switching unit on detection of a command to operate the motor of said switching unit in a direction of opening of the switching unit,
  with a second stage comprising one said device for preventing the starting of the motor provided with a second control device driven by an input for receiving said binary datum validated by a preventing/allowing circuit configured to block the passage of the binary datum when the motor to be started or in operation is the motor belonging to the unit and to allow the passage of the binary datum when the motor to be started or in operation is a motor external to the unit,
  with a third stage for managing the parallel line and the series line,
  with at least one power control stage provided with at least one pair of switches for supplying current for operating the motor in the direction of opening of the switching unit and for supplying current for operating the motor in the direction of closing of the switching unit.

8. The control unit according to claim 7, wherein the sequential logic is provided with at least a fourth stage provided with one or more third circuits for preventing/allowing the operation of the motor on detection of parameters of the motor.

9. The control unit for controlling at least one motor for operating a switching unit according to claim 7, wherein, on receiving a level representative of the operation of a motor external to the unit on the parallel line, said second control device switches signals for controlling the operation of the motor at the level of said device for preventing the starting of the motor in a direction of opening of the switching unit and in a direction of closing of the switching unit.

10. The control unit according to claim 7, wherein at least some of said control devices, circuits for preventing/allowing the operation of the motor, device for preventing the starting of the motor and device for inhibiting the operation of the motor are formed by signal-switching relays.

11. The control unit for controlling at least one motor for operating a switching unit according to claim 8, wherein at least some of said control devices, circuits for preventing/allowing the operation of the motor, device for preventing the starting of the motor and device for inhibiting the operation of the motor are formed by signal-switching relays, and wherein one of the control devices of the fourth stage comprises an input for an end-of-travel sensor for the opening of the switching unit connected to a coil for controlling the opening of a first relay for preventing/allowing the operation of the motor in the direction of opening of the switching unit so as to stop the motor at the end of opening of said switching unit and an input for an end-of-travel sensor for the closing of the switching unit connected to a coil of a second relay for preventing/allowing the operation of the motor in the direction of closing of the switching unit so as to stop the motor at the end of closing of said switching unit.

12. The control unit for controlling at least one motor for operating a switching unit according to claim 10, comprising a circuit for bypassing the device for preventing the starting of the motor activated by a circuit for detecting the operation of the motor of said control unit.

13. The control unit for controlling at least one motor for operating a switching unit according to claim 10, comprising a relay for allowing the operation of the motor, the coil of which is connected to an input for receiving a signal for detection of authorization of the operation of the motor.

14. The control unit for controlling at least one motor for operating a switching unit according to claim 10, comprising a relay for allowing/preventing operation, the coil of which is connected to an input for receiving a signal for detection of the grounding of the medium-voltage switch.

15. The control unit for controlling at least one motor for operating a switching unit according to claim 10, wherein the third stage comprises a stage for controlling authorization of the operation of the motor in the presence of an upstream connection to the series line.

16. The control unit for controlling at least one motor for operating a switching unit according to claim 15, wherein, in the presence of an upstream connection, the control for authorizing operation controls a relay, which closes the power supply of the cold spot of the coils of the power relays for controlling the motor, and closes a relay for zero-setting the parallel line during the operation of the motor of said unit to be transmitted to other units.

17. The control unit for controlling at least one motor for operating a switching unit according to claim 10, wherein the control unit is timed by the switching times of the signal-switching relays.

* * * * *